P. GEISER.
Grain Separator.
No. 13,644.
Patented Oct. 9, 1855.
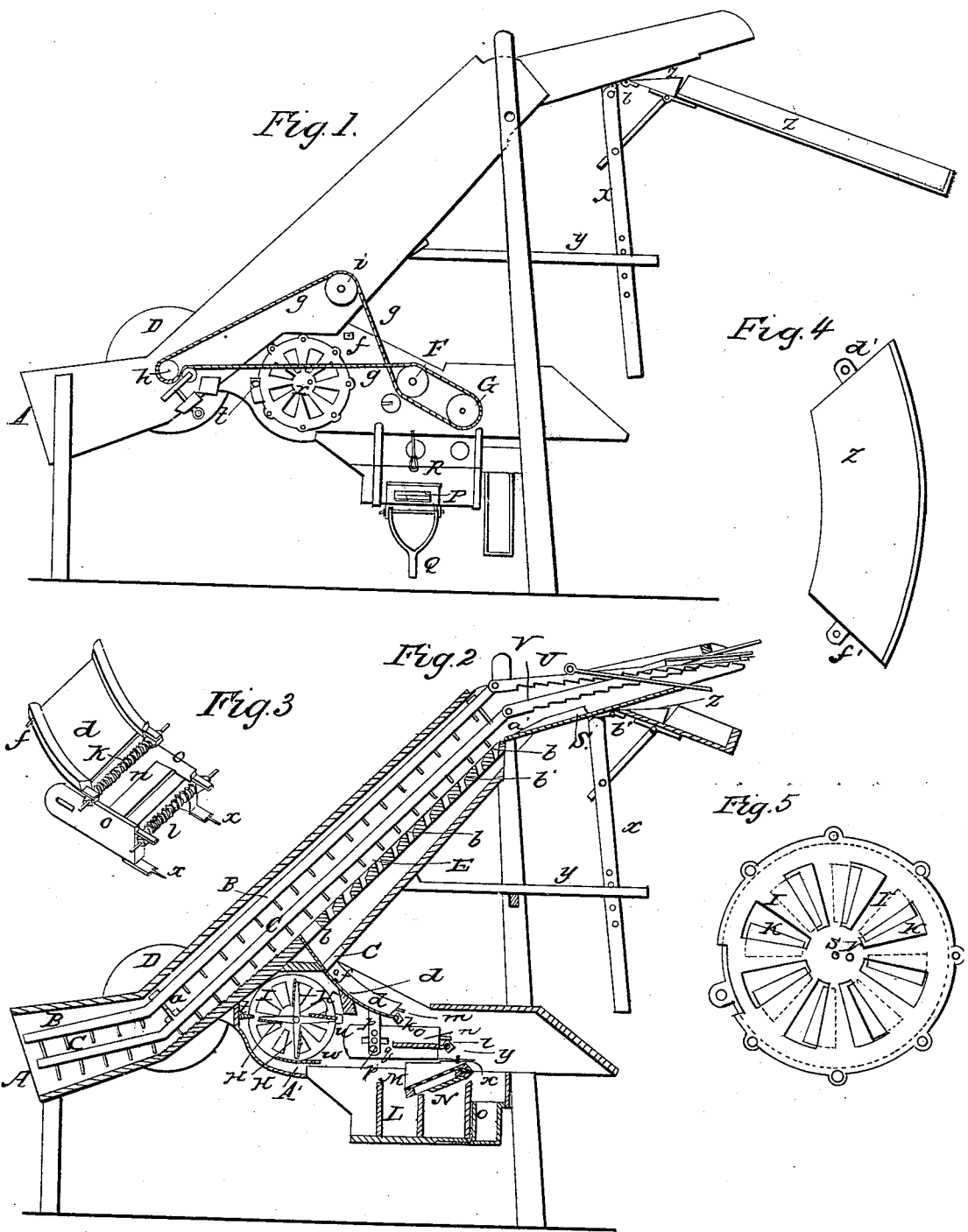

UNITED STATES PATENT OFFICE.

PETER GEISER, OF SMITHSBURG, MARYLAND.

GRAIN-SEPARATOR.

Specification of Letters Patent No. 13,644, dated October 9, 1855.

*To all whom it may concern:*

Be it known that I, PETER GEISER, of Smithsburg, in the county of Washington and State of Maryland, have invented certain new and useful Improvements in Grain-Separators; and I do hereby declare the following to be a full, clear, and exact description of the same, reference being had to the accompanying drawings, in which—

Figure 1, represents an elevation. Fig. 2, a longitudinal vertical section. Figs. 3, 4, and 5, detached views of details described hereafter.

Similar letters where they occur in the several figures denote like parts.

The nature of this invention relates to improvements in grain separating machines, the particulars of which will be seen from the following description.

When the grain has been threshed, it is fed by the threshing machine into the trunk of the grain cleaner at A, whence it is carried upward on the slide E, by means of a system of rakes as B and C. These rakers are set in motion by double cranks $a$, one of which is driven by the main shaft by means of the pulley D. On each of these cranks $a$ two other cranks have a position diametrically opposite to those $a$, so that the first and third, second and fourth, &c., have always the same position, and thus the rakers B will be in their highest position, when those of C, are in the lowest. Thus the straw is raked upward on the slide E, and the rakers acting at the same time like combs, will cause the single blades to assume a parallel position to each other; at the same time, they cause the grain to settle through the straw down to the inclined plane E, where, with the chaff, it can pass through the apertures $b$, and eventually through $c$ out to the curved apron or shoe $d$, represented in a perspective view in Fig. 3. This apron is fastened to the sides of the fan chamber by means of pivots or journals $f$, on which it can play freely. The rotary motion of the pulley D, is imparted to the pulleys F and G, by means of the bands $g$, and the small pulleys $h$ and $i$; the pulleys F and G drive the grooved rollers $k$ and $l$, represented in Fig. 3. It will be seen from the same figure that the edge of the apron is provided with teeth like a comb, and that the edge of each tooth approaches close to the projections of the grooved roller, and thus forms meshes through which the grain can fall, and also forms a substitute for a screen. The ends of the grooved rollers are square and on those rests the apron by means of the projections $m$; thus when the roller revolves the square ends act like cams, and impart to the curved shoe a jarring motion, which settles down the grain, and lets it pass through said meshes, while the chaff and unseparated grain pass over the roller $k$, and drops down onto a regulating dividing shelf or apron $n$, fixed to the side pieces $o$, as shown in Fig. 3, and which shelf or apron performs a very material office in the dividing of the heavy from the light grain. Both these aprons are adjustable as shown in Fig. 2, where the apron $d$, can be raised or lowered and kept stationary, by fixing a pin, into one of the holes $p$, and the nut $q$, which latter can slide in a slot. By means of these adjustments, the meshes can be enlarged or reduced, and thus the seeds of grass or grain of different sizes can be cleaned by the same machine. When the chaff with the unseparated grain has dropped down to the second apron $n$, it is exposed to the action of the blast created by a fan H; the journals of this fan play in grates or plates I, represented in Figs. 1 and 2, and in an enlarged scale in Fig. 5. Each one of these plates are provided with apertures through which the air enters for the supply of the fan; behind each stationary grate is a movable grate K, with exactly corresponding apertures, which can turn on a pin on its center at $s$, both movable grates are connected by bars $t$ and $u$, Fig. 2, by which both grates are secured firmly together; the cross bar $u$, is stationary but the bar $t$, which at both its ends is furnished with journals or axes which pass through the hole $v$, of the movable grate K, on which it can turn for the purpose hereafter described. The cross bar $t$, as represented in Fig. 2, has two broad sides, and one narrow one. When the speed of the fan is too great, which causes the grain to be blown off with the chaff, the fan acts against the broad surface of the cross bar $t$, and said pressure will press the bar downward, and with it the movable grates K, which will thus reduce the size of the apertures as represented in Fig. 5, and will thus allow only a smaller quantity of air to enter the fan chamber, and thus reduce the blast. The movable grate K, is balanced in such a manner, that it can only move in a closing direction, when acted upon by the blast, and thus as soon as the intensity of the blast, and with it, its action on the cross bar $t$, ceases, it will return to its first position leaving the apertures entirely open. As mentioned above the cross bar $t$, is movable on its bearings, and can thus be turned by means of a handle, so as to oppose any desired side or surface to the fan blast, which will give the means to regulate the blast to any degree, or in other words it may act as an automatic regulator, or may be set by hand to any desired blast required, by means of a nut, screw, rod or weight.

There is a small partition $w$, in the fan chamber for the purpose of dividing the blast and thus creating an additional blast produced by the same velocity of the fan; in consequence of having outlets, at different points in the fan chamber and also the advantage of directing the blast to different points. When the grain has dropped to the second regulating shelf or apron $n$, it is exposed to the blast; said apron has a shoulder, offset, or recess in its center, which divides it into two planes, one extending forward the other backward, the heavy grain which remains on the rear inclination, after the chaff has been blown off will drop down into the receiving bore L, by the action of the jarring motion of the said shelf or apron $n$, which is created in the same manner, as that described in regard to the apron $d$. The ligher grain will go forward through the meshes formed by the comb and the grooved roller $l$, and will drop down to the screen M, whence it will fall into the receiving box.

Said screen receives its jarring motion from the apron $n$, to which it is attached by means of the pins $x$, passing through the staples $y$. The grain and fine impurities which drop on to the screen M, are there acted upon by the blast coming through the aperture A'; the grain will move over the screen, and fall down into the receiving box L and the lighter impurities will settle on the filth board N, and thence into the box, whence they can be taken out by opening the sliding door at the bottom. P, in Fig. 1, represents the aperture in the receiving box L, whence the grain can be filled in sacks. To facilitate this work the iron clamp Q, is attached to the exterior of said box, and said sacks can be fastened to it at the aperture P, by hooking the clamp Q, into the loop R, after having fixed the sack on said clamp.

When the straw has been acted upon by the rakers B and C, and all the grain is separated from it, it is carried upon a second inclined plane S, where it is acted upon by a second set of rakers U, V, each of which is respectively connected by means of a pin to one of the rakers B, or C, at one end and plays with the other end in a mortised cross bar T. These rakers shove the straw outward to the place where it is to be stored and for that purpose it is necessary that the slide S should be raised or lowered, which can be done by hinging it to the slide E as represented at $a'$, it being supported by the brace X, in which an adjustable pin rests on a cross bar $y$. The slide Z, which is attached to the slide S, by means of the hinges $b'$ inclines in a direction opposite to the one of slide S, and can also be raised or lowered by a similar arrangement. The shape of this slide is shown in Fig. 4; it can be attached to the piece $z$, on either of the sides $d'$, $f'$, and will by its curved shape, afford the means of conveying the straw to either side of the machine, and to any desired locality.

Having thus fully described the nature of my invention, I would state that, I am aware, a self acting blast regulator for fan blowers is not new; this I do not therefore claim, but—

What I do claim as new and desire to secure by Letters Patent is,

1. The vanes within the fan case against which the blast acts, for the purpose of closing or opening the register automatically, to regulate the blast as set forth.

2. I also claim the manner of separating the grain from the straw and other impurities, by means of the aprons, combs and grooved rolls, without the use of a riddle, whether one, two, or more sets of such separating apparatus be used, substantially as described.

3. I also claim in combination with the separating apparatus the self regulating dividing shelf, upon which the grain drops, for the purpose of carrying the heavy grain back, and the ligher forward for a second or more complete separation, as set forth.

4. I also claim the hinging of the upper, to the lower portion of the straw carrier frame, and providing it with adjustable slides or conveyers, for dividing and conveying the straw into any desired localities as set forth.

PETER GEISER.

Witnesses:
 A. B. STOUGHTON,
 THOS. H. UPPERMAN.